United States Patent [19]

Lo

[11] Patent Number: 5,123,295
[45] Date of Patent: Jun. 23, 1992

[54] BICYCLE MEMBER FOR MOUNTING A BRAKING DEVICE ON A BICYCLE REAR FORK

[76] Inventor: Kun-Nan Lo, No. 33, Hsiang-Ho Rd., Li-Lin Tsun, Tan-Tsu Hsiang, Taichung Hsien, Taiwan

[21] Appl. No.: 596,235

[22] Filed: Oct. 12, 1990

[51] Int. Cl.⁵ .............................. F16C 1/10; B62L 1/02
[52] U.S. Cl. .............................. 74/502.2; 188/24.12
[58] Field of Search .......................... 74/502.2, 572; 188/24.12, 24.21, 24.22

[56] References Cited

U.S. PATENT DOCUMENTS

| | | | |
|---|---|---|---|
| 4,051,924 | 10/1977 | Yoshigai | 188/24.12 |
| 4,391,353 | 7/1983 | Mathauser | 188/24.12 |
| 4,441,592 | 4/1984 | Everett | 188/24.12 |
| 4,470,483 | 9/1984 | Holtz | 188/24.12 |
| 4,511,018 | 4/1985 | Scott | 188/24.12 |
| 4,538,707 | 9/1985 | Schoch | 188/24.22 |
| 4,546,858 | 10/1985 | Nagano | 188/24.22 X |
| 4,553,641 | 11/1985 | Scott et al. | 74/502.2 X |
| 4,660,435 | 4/1987 | Davis et al. | 74/572 |
| 4,793,444 | 12/1988 | Nagano | 188/24.12 |
| 4,960,187 | 10/1990 | Chi | 188/24.12 |

FOREIGN PATENT DOCUMENTS 60629  11/1954  France ............. 188/24.12

*Primary Examiner*—Vinh T. Luong
*Attorney, Agent, or Firm*—Cushman, Darby & Cushman

[57] ABSTRACT

A bicycle member for mounting a braking device to a rear fork of a bicycle, the fork having a pair of tubular tines, each made of a composite plastic material, at least one of the tines having a mounting hole. The bicycle member includes a metal member, at least a part of which is adapted to be disposed within the mounting hole. The metal member has a resin impregnated fibrous material wrapped around it so that the fibrous material is disposed between the metal member and the one tine.

2 Claims, 3 Drawing Sheets

BICYCLE MEMBER FOR MOUNTING A BRAKING DEVICE ON A BICYCLE REAR FORK

BACKGROUND OF THE INVENTION

1. Field Of The Invention

The invention relates to a mounting device, more particularly to a bicycle member to mount a braking device on the rear fork of a bicycle.

2. Description Of The Related Art

A conventional rear fork includes a pair of metal tines and a rear wheel assembly provided between the tines. The bicycle braking device is pivotably mounted on the tines via a pair of stationary flange seats welded to the tines. When actuated, the braking device impedes the motion of the wheel, slowing it down, and eventually stopping the movement of the bicycle.

Examples of materials used to fabricate the metal tines include iron, aluminum, and stainless steel. However, these materials make the fork relatively heavy, which is inconsistent with the current practice of keeping the bicycle as light as possible. Furthermore, the scars which result from the welding operations are difficult to remedy, thereby permanently disfiguring the bicycle.

Recent developments have made possible the use of composite plastic materials (such as carbon fibers) to fabricate most bicycle parts so as to reduce the bicycle's weight. Direct mounting of the braking device on a plastic tine, however, is not possible since the difference in the properties of the materials used to fabricate the metal stationary seats and the plastic tines renders the welding operation ineffective.

SUMMARY OF THE INVENTION

Therefore, the objective of the present invention is to provide a metal bicycle member, for mounting a braking device on a bicycle rear fork made of composite plastic materials, that can be fixed onto the tines of the rear fork without the need for a welding operation.

Accordingly, the preferred embodiment of a bicycle member of the present invention is used to mount a braking device on a bicycle rear fork having a pair of tubular tines made of a composite plastic material and extending at two sides of a rear wheel of the bicycle. At least one of the tines is provided with a mounting hole. The bicycle member includes a metal support member and a resin impregnated fibrous material wrapping the support member. The support member and the fibrous material are fitted in the mounting hole. The fibrous material is cohesively bonded to the one tine after heat is applied to the fibrous material and to the one tine. The support member has a central axial threaded bore. A screw is used to tightly secure the braking device to the support member at the threaded bore. The support member thus serves as a support for mounting the braking device on the rear fork.

BRIEF DESCRIPTION OF THE DRAWINGS

Other features and advantages of this invention will become apparent in the following detailed description of the preferred embodiment with reference to the accompanying drawings, of which.

DETAILED DESCRIPTION OF THE PREFERRED EMBODIMENT

Figure 1:
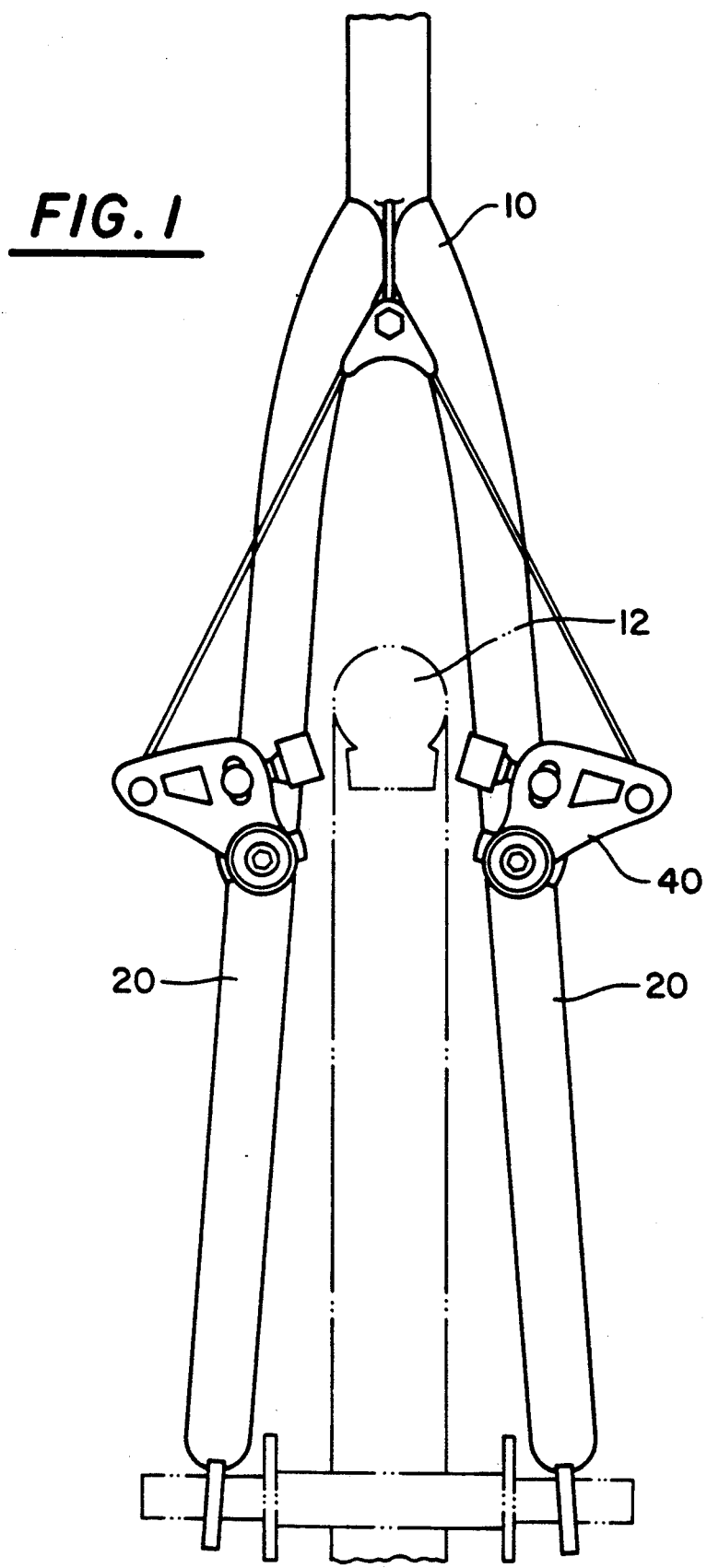
FIG. 1 is an illustration of a bicycle rear fork having a braking device mounted thereon.
Figure 2:
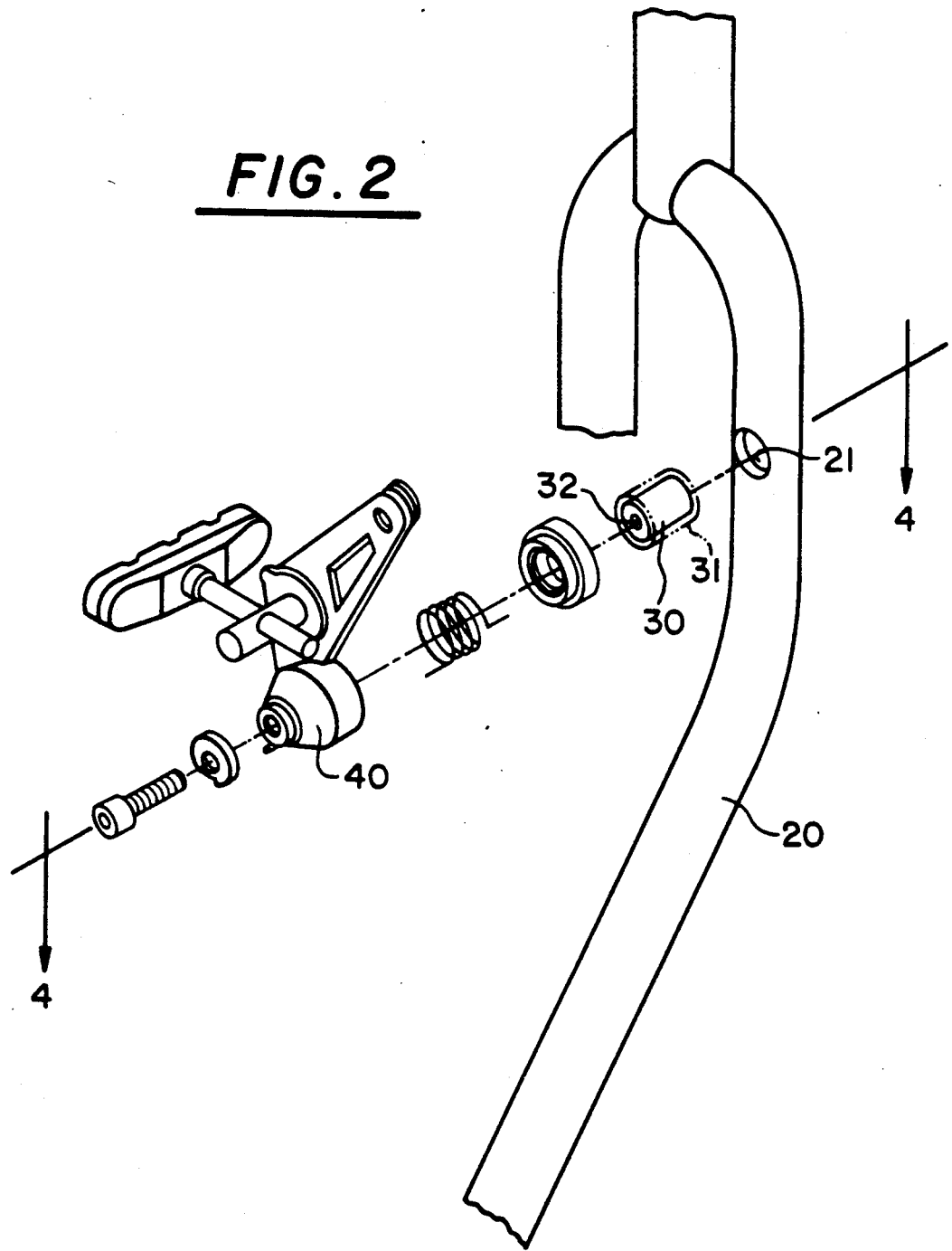
FIG. 2 is an exploded view of the preferred embodiment of a bicycle member according to the present invention.

Referring to FIGS. 1 and 2, the rear fork 10 of a bicycle includes a pair of tubular tines 20, each tine 20 extending on one of the sides of a rear wheel 12. The tines 20 are made of a composite plastic material.

Figure 3:
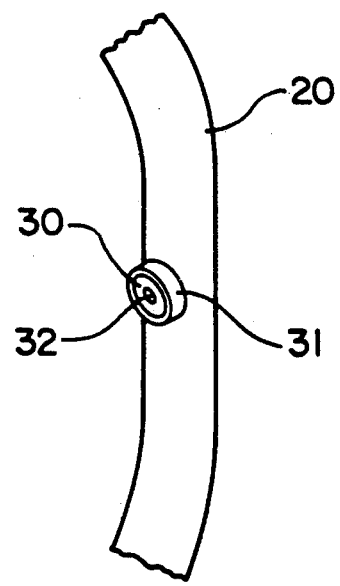
FIG. 3 illustrates the assembly of the preferred embodiment on the rear fork of a bicycle.

Referring to FIGS. 2 and 3, a bicycle member according to the present invention is shown to comprise a pair of cylindrical metal support members 30. Each of the support members 30 is wrapped in an epoxy resin impregnated fibrous material (preferably made of carbon fibers) 31 and is fitted into a mounting hole 21 provided on each of the tines 20. Each support member 30 has a central axial threaded bore 32. The support members 30 reinforce the portion of the tubular tines 20 near the mounting hole 21.

Figure 4:
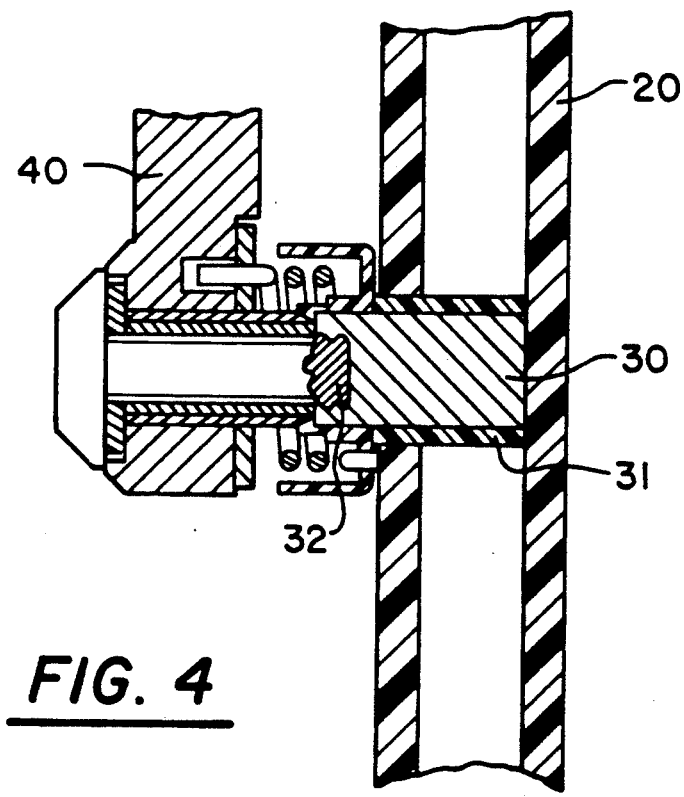
FIG. 4 is a sectional view along line 4 of FIG. 2 illustrating the mounting of the braking device on the rear fork of a bicycle by means of the bicycle member of the present invention.

Referring once more to FIGS. 1, 2 and 4, a braking device 40 is mounted to the tines 20 and is tightly secured to the support members 30 by means of screws threadedly engaging the central axial threaded bores 32. Once actuated, the braking device 40 impedes the motion of the wheel 12 to slow down or stop the movement of the bicycle.

The support members 30, the fibrous materials 31 and the tubular tines 20 are assembled as shown in FIG. 3. The fibrous materials 31 and the tubular tines 20 are heated and pressurized in a die. When heated, the fibrous materials 31 are cured and cohesively bonded to the tubular tines 20.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A bicycle member comprising:
   a bicycle fork, said fork having a pair of tubular tines, each of said tines being made of composite material, at least one of said tines having a mounting hole; and
   metal member at least a part of which is adapted to be disposed within said mounting hole; and
   a resin impregnated fibrous material wrapped around said metal member such that when said metal member is inserted within said mounting hole, said resin impregnated fiber material is disposed between said metal member and said one tine, the fibrous material bonding to said one tine when heated.

2. A bicycle member as claimed in claim 1, wherein said metal member is cylindrical in shape having two ends, one of said ends having a threaded blind hole therein.

* * * * *